United States Patent
Jansson et al.

(10) Patent No.: US 11,565,360 B2
(45) Date of Patent: Jan. 31, 2023

(54) DUST COLLECTION FOR CUTTING MACHINE

(71) Applicant: UWM Research Foundation, Inc., Milwaukee, WI (US)

(72) Inventors: Kyle Steven Jansson, Brookfield, WI (US); J. Dennis Lang, Mequon, WI (US); Madeline Charlotte Frank, Mequon, WI (US)

(73) Assignee: UWM Research Foundation, Inc., Milwaukee, WI (US)

(*) Notice: Subject to any disclaimer, the term of this patent is extended or adjusted under 35 U.S.C. 154(b) by 755 days.

(21) Appl. No.: 16/368,242

(22) Filed: Mar. 28, 2019

(65) Prior Publication Data

US 2019/0366575 A1 Dec. 5, 2019

Related U.S. Application Data

(60) Provisional application No. 62/680,146, filed on Jun. 4, 2018.

(51) Int. Cl.
   *B23Q 3/157* (2006.01)
   *B23Q 11/08* (2006.01)
   *B23Q 11/00* (2006.01)

(52) U.S. Cl.
   CPC ...... *B23Q 11/0046* (2013.01); *B23Q 11/0825* (2013.01); *B23C 2230/08* (2013.01);
   (Continued)

(58) Field of Classification Search
   CPC ............ B23Q 11/0046; B23Q 11/0825; B23Q 11/08–11/0891; B23Q 11/006;
   (Continued)

(56) References Cited

U.S. PATENT DOCUMENTS

| 4,537,234 A | 8/1985 | Onsrud |
| 5,791,842 A * | 8/1998 | Sugata ................. B23Q 1/0036 408/61 |

(Continued)

FOREIGN PATENT DOCUMENTS

| CN | 200970687 Y * 11/2007 |
| CN | 202097603 U    1/2012 |

(Continued)

OTHER PUBLICATIONS

Machine Translation of JP 08-071884 A, which JP '884 was published Mar. 1996.*

(Continued)

*Primary Examiner* — Erica E Cadugan
(74) *Attorney, Agent, or Firm* — Michael Best & Friedrich LLP

(57) ABSTRACT

A dust collection assembly for a computer numerical control (CNC) cutting machine includes an adapter configured to couple to an arm of the CNC cutting machine and a head telescopically coupled to the adapter by a plurality of nested members. The CNC cutting machine includes the arm supporting a spindle and a tool holder coupled for co-rotation with the spindle. Each of the plurality of nested members are collapsible relative to each other. The head is movable between an extended position in which the nested members are configured to surround the tool holder and a tool bit, and a retracted position in which at least some of the nested members are telescopically received in the adapter. The head defines an inlet fluidly connected to the plurality of nested members when the head is at least in the extended position. The inlet is configured to fluidly connect to a vacuum.

13 Claims, 12 Drawing Sheets

(52) U.S. Cl.
CPC ... *B23Q 3/15706* (2013.01); *Y10T 409/30392* (2015.01); *Y10T 409/304088* (2015.01); *Y10T 483/115* (2015.01); *Y10T 483/1793* (2015.01)

(58) Field of Classification Search
CPC ............ B23Q 11/0042; B23Q 11/0841; B23Q 11/0816; Y10T 409/30392; Y10T 409/304088
USPC .................................................. 409/134, 137
See application file for complete search history.

(56) References Cited

U.S. PATENT DOCUMENTS

| | | | |
|---|---|---|---|
| 5,947,661 A * | 9/1999 | Sugata ................. | B23Q 1/0036 409/131 |
| 6,061,865 A | 5/2000 | Susnjara et al. | |
| 6,079,078 A | 6/2000 | Byington | |
| 6,394,940 B1 * | 5/2002 | Sugata ............... | B23Q 11/0046 408/61 |
| 7,168,894 B2 * | 1/2007 | Hansson ............ | B23Q 11/0046 408/58 |
| 7,441,484 B1 | 10/2008 | Larsen et al. | |
| 7,465,132 B2 | 12/2008 | Gipson | |
| 7,905,260 B2 | 3/2011 | Keenan | |
| 2005/0232717 A1 * | 10/2005 | Ferrari ............... | B23Q 11/0046 409/137 |
| 2012/0051858 A1 * | 3/2012 | Everington, Jr. .. | B23Q 11/0046 408/67 |
| 2015/0360298 A1 | 12/2015 | Buczek | |
| 2017/0282318 A1 | 10/2017 | Chepurny | |

FOREIGN PATENT DOCUMENTS

| | | | |
|---|---|---|---|
| CN | 203156961 U | | 8/2013 |
| CN | 204338944 U | | 5/2015 |
| CN | 105234524 B | | 1/2016 |
| CN | 106808301 A | | 6/2017 |
| CN | 207102172 U | | 3/2018 |
| DE | 3129881 A | * | 2/1983 |
| DE | 3140776 A | * | 4/1983 |
| DE | 3733534 A1 | * | 4/1989 |
| DE | 3734127 A | * | 4/1989 |
| EP | 1260308 A1 | * | 11/2002 |
| GB | 571629 A | * | 9/1945 |
| GB | 571794 A | * | 9/1945 |
| GB | 574285 A | * | 12/1945 |
| GB | 580144 A | * | 8/1946 |
| GB | 2096030 A | * | 10/1982 |
| JP | 08-071884 A | * | 3/1996 |
| KR | 10-2008-0084050 A | * | 9/2008 |
| KR | 100890990 B1 | | 4/2009 |

OTHER PUBLICATIONS

Machine Translation of EP 1260308 A1, which EP '308 was published Nov. 2002.*
Machine Translation of CN 200970687 Y, which CN '687 was published Nov. 2007.*
Machine Translation of KR 10-2008-0084050-A, which KR '050 was published Sep. 2008.*
Axiom, "Axiom Overarm Dust System," <https://www.rockler.com/axiom-overarm-dust-system> web page publicly available at least as early as May 4, 2018.
Axiom, "Dust Shoe for Axiom AutoRoute 1 Hobby CNC," <http://www.rockler.com/dust-shoe-for-axiom-autoroute-1-basic-cno> web page publicly available at least as early as May 4, 2018.
AXYZ, "High Capacity Pressure Foot from AXYZ International," <https://www.youtube.com/watch?v=VErqu24FQmw> web page publicly available at least as early as Nov. 28, 2014.
C.R. Onsrud Inc, "Automatic Material Removal System by C.R. Onsrud CNC Routers," <https://www.youtube.com/watch?v=aoF3h2j_Uug&feature=youtu.be> web page publicly available at least as early as Apr. 21, 2009.
Infinity Cutting Tools, "DRILLNADO Drill Press Dust Collection System," <https://www.infinitytools.com/drillnado-drill-press-dust-collection-system-4457> web page publicly available at least as early as Aug. 2, 2018.
KENT/CNC, "Dust Shoes (Standard & Mini)," <https://www.kentcnc.net/nc/dust-shoes-standard-and-mini> web page publicly available at least as early as May 4, 2018.
Next Wave, "Dust Boot for CNC Shark," <https://www.rockler.com/dust-boot-for-cnc-shark> web page publicly available at least as early as May 4, 2018.
Suckit Dust Boot & Safety Guard, "Suckit for Shapeoko 2 with 2 1/2" Vacuum Hose Adapter," <https://www.suckitdustboot.com/product-page/suckit-mzd-bit-changing-version-for-shapeoko-2-with-2-1-2-vacuum-hose-adapter> web page publicly available at least as early as May 4, 2018.

* cited by examiner

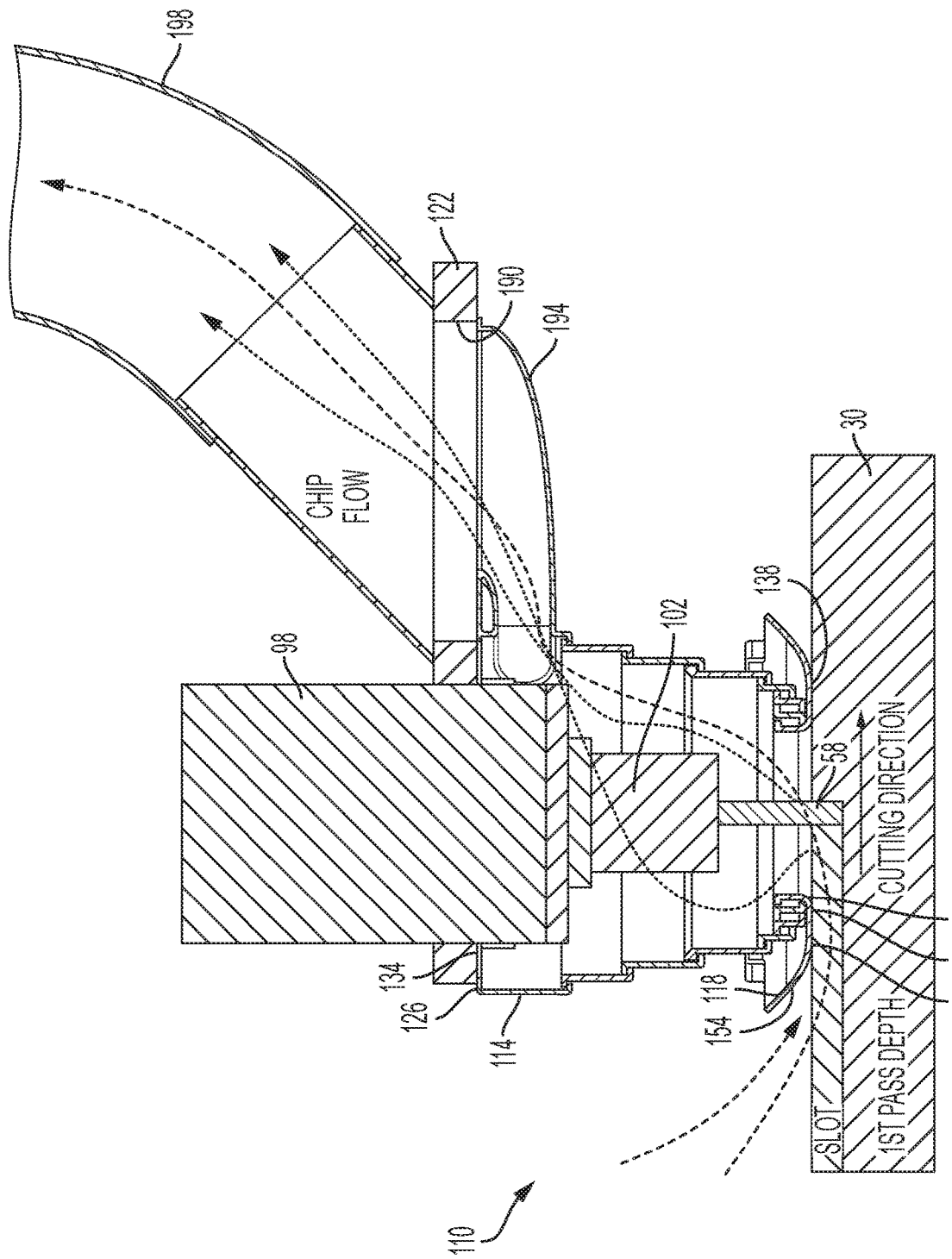

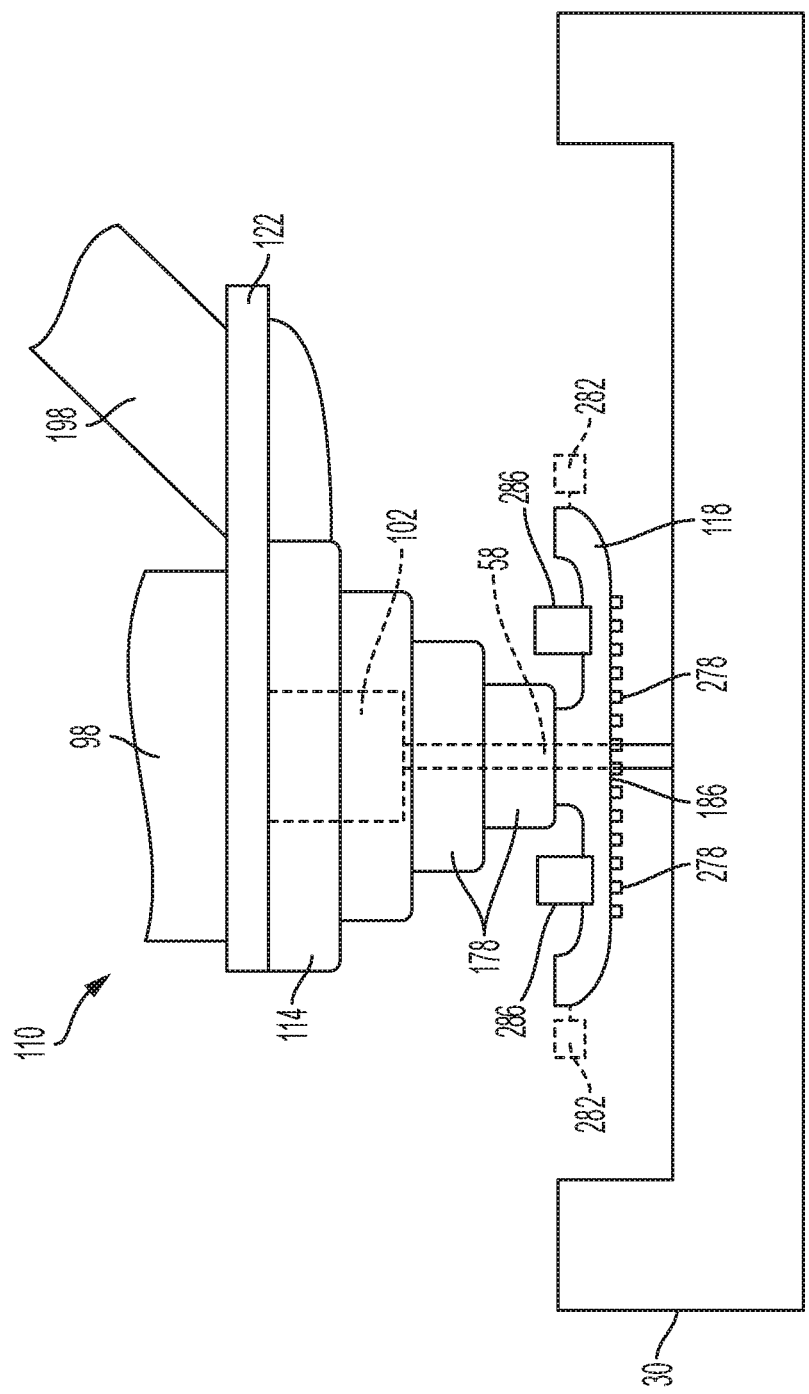

DUST COLLECTION FOR CUTTING MACHINE

CROSS-REFERENCE TO RELATED APPLICATIONS

This application claims priority to U.S. Provisional Patent Application No. 62/680,146, filed Jun. 4, 2018. The contents of which are incorporated herein by reference.

FIELD OF THE INVENTION

Embodiments described herein relate to a dust collection assembly for a cutting machine, and more particularly to automatic adjustment of the dust collection assembly between a retracted position and extended position for facilitating changing of a tool bit of the cutting machine.

SUMMARY

Cutting machines, such as a computer numerical control (CNC) machine, include a cutting unit capable of receiving different types of the tool bits. The cutting machine may further include a dust collection assembly proximate the tool bit for inhibiting the accumulation of debris such as dust, chips, etc. near the tool bit during cutting of a material. The dust collection assembly may be a physical obstacle to the changing of the tool bit to a different tool bit, and may require manual intervention. Further, dust collection assemblies that are improperly sized or shaped may not provide adequate suction to remove debris.

At least some embodiments described herein allow the automatic movement of the dust collection assembly to permit changing of the tool bit, and allow improved suction of debris, thereby reducing one or more of the aforementioned issues.

In one aspect, a dust collection assembly for a computer numerical control (CNC) cutting machine includes an adapter configured to couple to an arm of the CNC cutting machine and a head telescopically coupled to the adapter by a plurality of nested members. The CNC cutting machine includes the arm supporting a spindle and a tool holder coupled for co-rotation with the spindle. The tool holder is configured to selectively receive a tool bit. Each of the plurality of nested members are collapsible relative to each other. The head is movable between an extended position in which the nested members are configured to surround the tool holder and a tool bit, and a retracted position in which at least some of the nested members are telescopically retracted towards the adapter. The head defines an inlet fluidly connected to the plurality of nested members when the head is at least in the extended position. The inlet is configured to fluidly connect to a vacuum. The head is configured to contact a workpiece when the head is in the extended position.

In yet another aspect, a computer numerical control (CNC) cutting machine includes a base configured to support a workpiece, an arm movably supported by the base, a spindle rotatably supported by the arm, and a tool holder coupled for co-rotation with the spindle. The tool holder is configured to selectively receive a tool bit. The CNC cutting machine further includes a dust collection assembly supported by the arm. The dust collection assembly includes an adapter coupled to the arm, and a head telescopically coupled to the adapter by a plurality of nested members. Each of the plurality of nested members are collapsible relative to each other. The head is movable between an extended position in which the nested members are configured to surround the tool holder and a tool bit, and a retracted position in which at least some of the nested members are telescopically retracted towards the adapter. The head defines an inlet fluidly connected to the plurality of nested members when the head is at least in the extended position. The inlet is configured to fluidly connect to a vacuum. The head is configured to contact a workpiece when the head is in the extended position.

In another aspect, a method for automatically adjusting a position of a dust collection assembly of a computer numerical control (CNC) cutting machine includes positioning, by a control system, a spindle of the CNC cutting machine in a cutting zone of the CNC cutting machine. The dust collection assembly includes an adapter and a head supported by an arm of the CNC cutting machine. The method further includes adjusting, by the control system, the head of the dust collection assembly into an extended position such that the head is in the extended position when the spindle is in the cutting zone. The head contacts the workpiece in the extended position. The method further includes controlling, by the control system, operation of the spindle when in the cutting zone for cutting a workpiece located in the cutting zone by a first tool bit coupled for co-rotation with the spindle. The method further includes positioning the spindle from the cutting zone into a tool changing zone; and adjusting, by the control system, the head from the extended position into a retracted position such that the head is in the retracted position when the spindle is in the tool changing zone; and replacing, by the control system, the first tool bit with a second tool bit when the spindle is in the tool changing zone and the head is in the retracted position.

Other aspects of the disclosure will become apparent by consideration of the detailed description and accompanying drawings.

BRIEF DESCRIPTION OF THE DRAWINGS

FIG. 6 is another cross-sectional view of the dust collection assembly of FIG. 4B illustrating a workpiece to be cut by the cutting machine of FIG. 1 and a vacuum hose connected to the dust collection assembly.

FIG. 12 is a schematic diagram of the dust collection assembly of FIG. 3.

DETAILED DESCRIPTION

Before any embodiments of the disclosure are explained in detail, it is to be understood that the disclosure is not limited in its application to the details of construction and the arrangement of components set forth in the following description or illustrated in the following drawings. The disclosure is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings. Terms of degree, such as "substantially" or "approximately" are understood by those of ordinary skill to refer to reasonable ranges outside of the given value, for example, general tolerances associated with manufacturing, assembly, and use of the described embodiments. For example, "substantially" can be defined as being within about 5 percent to about 10 percent of a given value.

Illustrated herein are various embodiments of a dust collection assembly for removing debris during cutting of a workpiece by a cutting machine, such as a computer numerical control (CNC) router (i.e., CNC endmill, CNC machine). The dust collection assembly is positioned close to or proximate a cutting tool bit of the cutting machine for directing the debris through the dust collection assembly by suction force (e.g., supplied by a vacuum). The dust collection assembly is movable away from the tool bit to facilitate the changing of the tool bit to a different tool bit. The movement of the dust collection assembly may be automatic.

Figure 1:
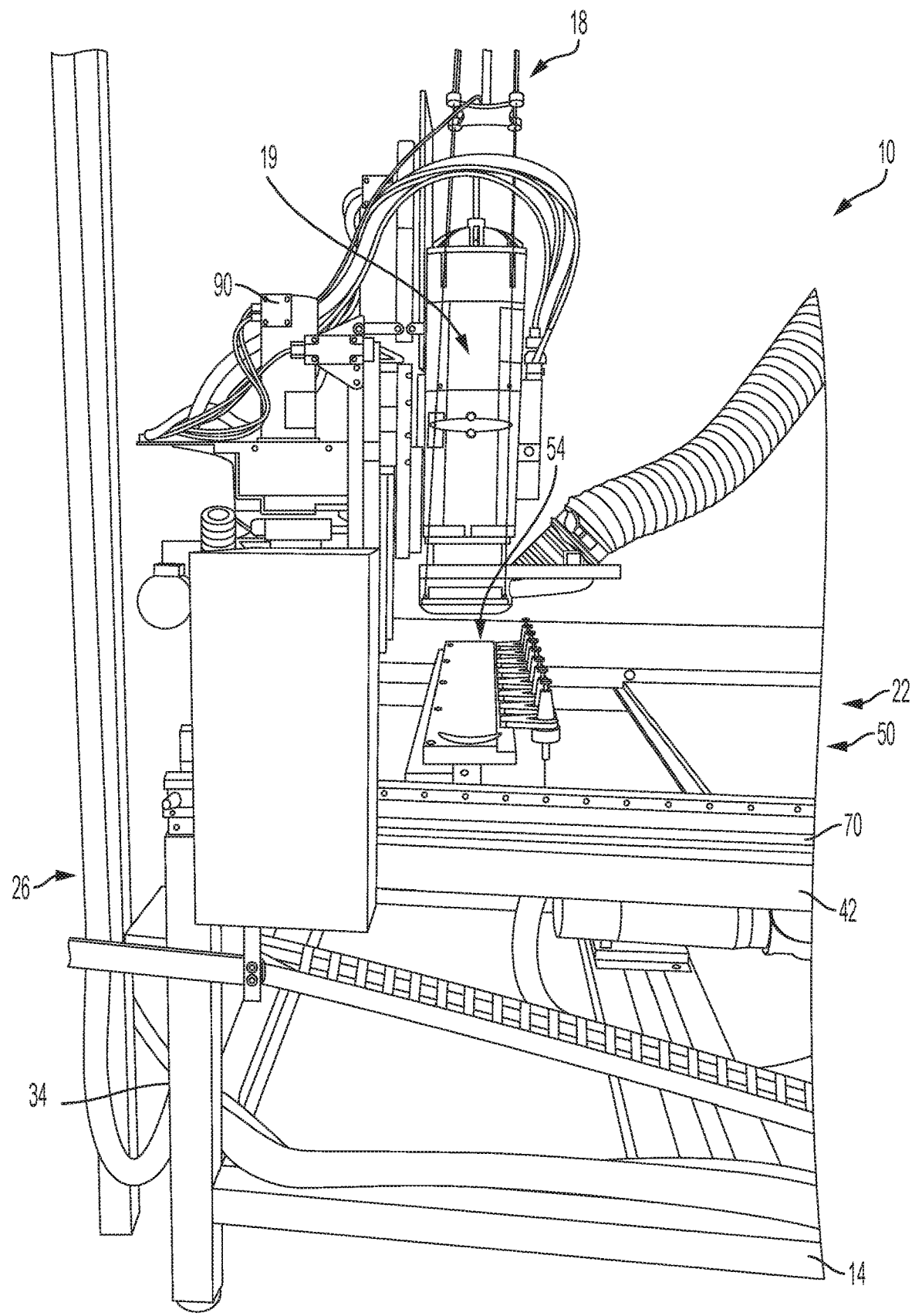
FIG. 1 is a side view of a portion of a cutting machine including a base and a cutting unit.
Figure 2:
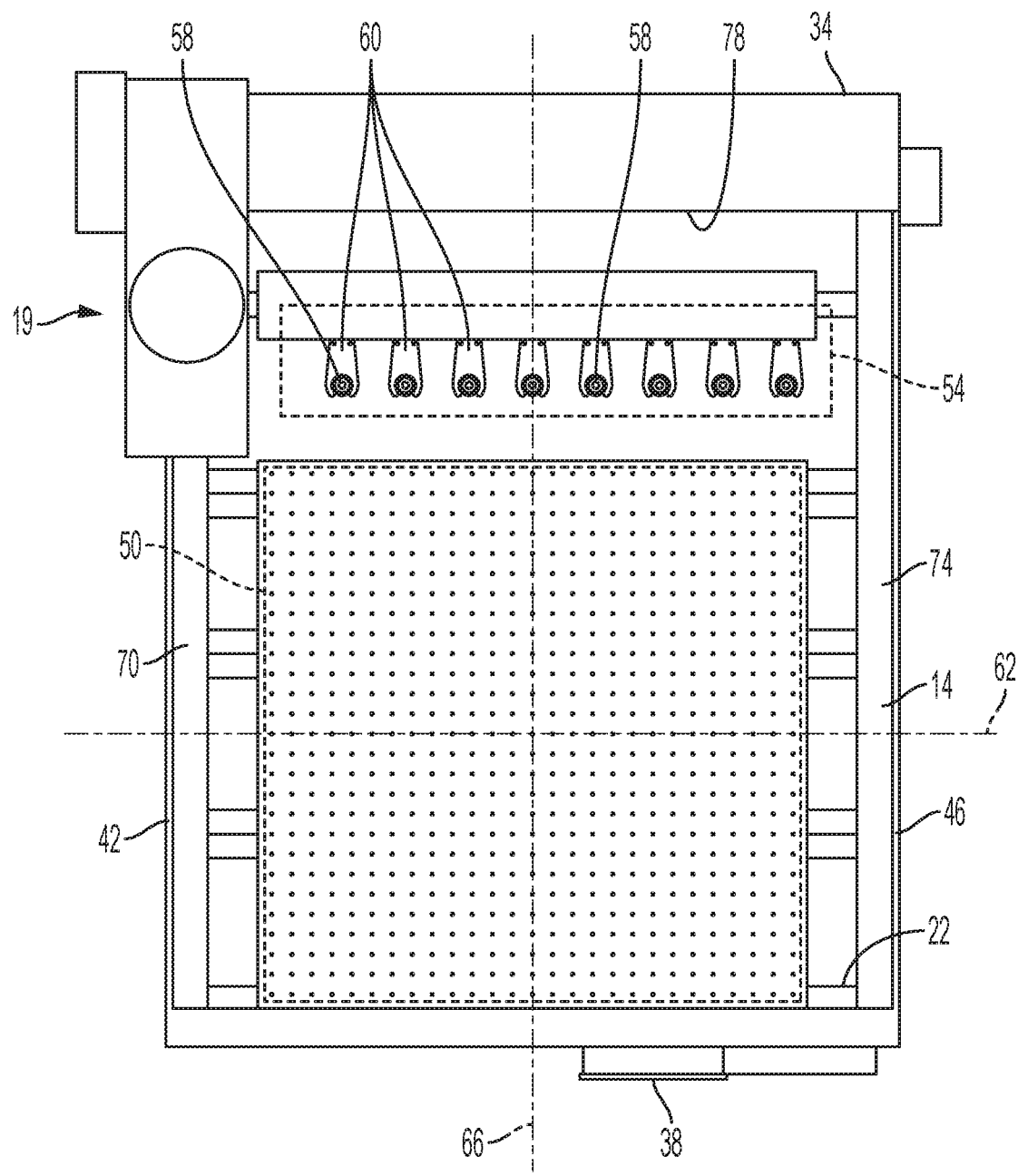
FIG. 2 is a plan view of the base illustrating a cutting zone and a tool changing zone of the cutting machine of FIG. 1.
Figure 3:
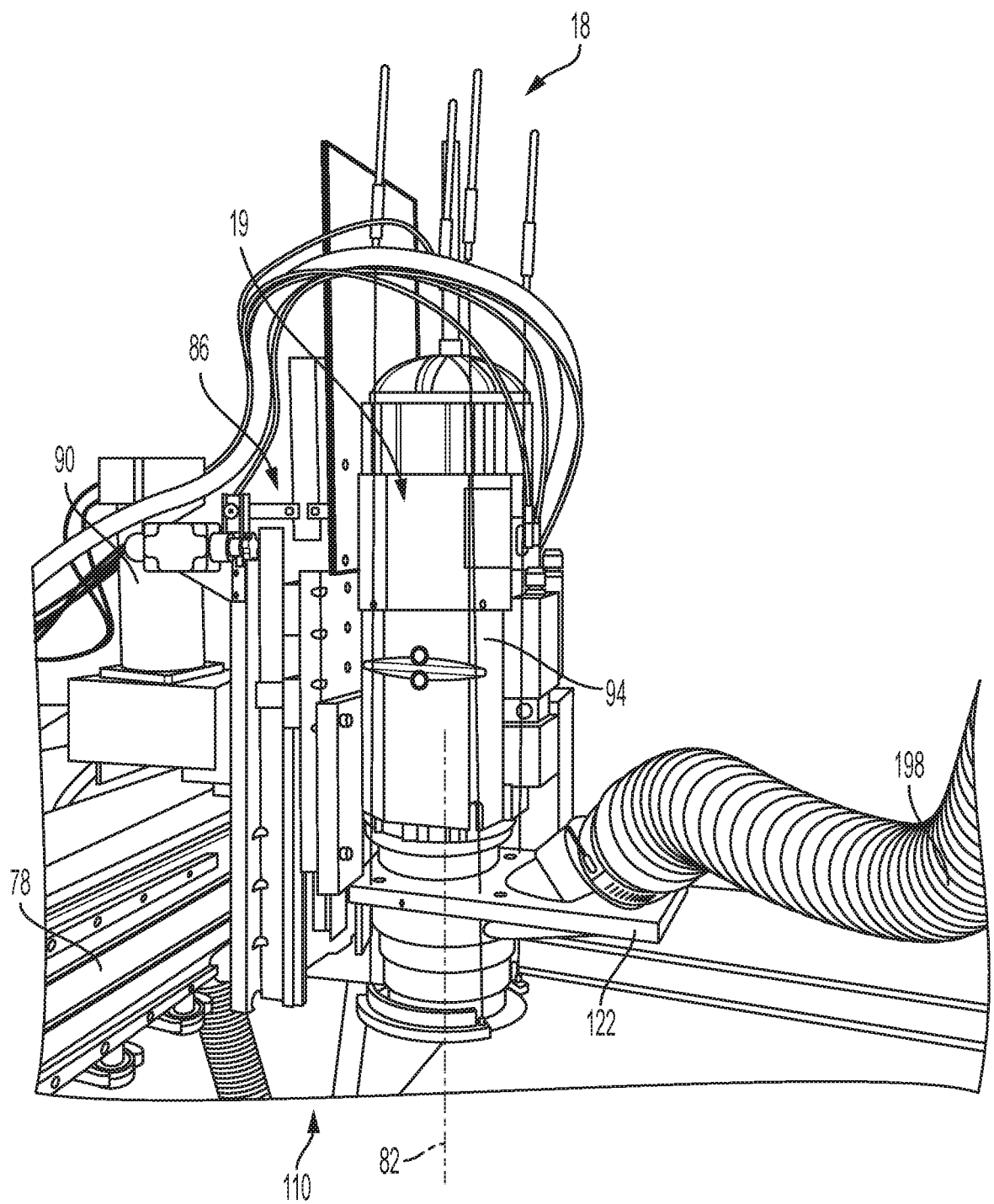
FIG. 3 is an enlarged side view of the cutting unit of FIG. 1 illustrating a dust collection assembly.

FIGS. 1-3 illustrate a CNC cutting machine (e.g., CNC router 10). The CNC router 10 includes a base 14 (only a portion of which is shown in FIG. 1) and a cutting unit 18. The base 14 supports a table 22 and a positioning assembly 26 of the CNC router 10. The table 22 is configured to support a workpiece 30 (FIG. 6). The workpiece 30 may be formed by a material such as wood, metal, plastic, foam, fiber, rubber, and/or otherwise may be formed by some type of engineered material, composite material, etc. The base 14 includes a first end 34 and a second end 38 (FIG. 2) opposite the first end 34. First and second sides 42, 46 of the base 14 extend between the first and second ends 34, 38.

With reference to FIGS. 1 and 2, the base 14 supports a plurality of zones 50, 54 of the CNC router 10. The illustrated CNC router includes a cutting zone 50 and a tool changing zone 54. The illustrated cutting zone 50 is positioned closer to the second end 38 than the tool changing zone 54. In other words, the tool changing zone 54 is positioned proximate the first end 34. In other embodiments, the tool changing zone 54 is positioned proximate other sides or ends of the base 14. The table 22 defines the cutting zone 50. The workpiece 30 is positioned on the table 22 in the cutting zone 50 for cutting by the cutting unit 18. The cutting unit 18, which includes a motorized cutting tool assembly 19 (e.g., router), is also positionable in the tool changing zone 54 for changing a tool bit 58 (FIG. 5A) of the cutting unit 18. The tool changing zone 54 includes a plurality of tool bit holders 60, each tool bit holder 60 configured to receive and retain the respective tool bit 58. The cutting unit 18 is movable between the different zones 50, 54 by the positioning assembly 26.

In particular, the cutting unit 18 is supported by and movable relative to the base 14 along a first axis 62 and a second axis 66 by the positioning assembly 26. In the illustrated embodiment, the positioning assembly 26 includes a first rail 70, a second rail 74, and an intermediate rail 78 extending therebetween (FIG. 2). The intermediate rail 78 is positioned at the first end 34 of the base 14, and the first and second rails 70, 74 are positioned at the opposite first and second sides 42, 46, respectively, of the base 14. The intermediate rail 78 defines the first axis 62 representing an x-coordinate direction of the CNC router 10. The first rail 70 and the second rail 74 define the second axis 66 representing a y-coordinate direction. In other embodiments, the coordinate directions may be reversed in which the first and second rails 70, 74 define the first axis 62 representing the x-coordinate direction, and the intermediate rail 78 defines the second axis 66 representing the y-coordinate direction.

With particular reference to FIG. 3, the cutting unit 18 may be movable relative to the base 14 along a third, cutting axis 82 representing a z-coordinate direction of the CNC router 10. In the illustrated embodiment, the cutting unit 18 is supported on the intermediate rail 78 by a height adjustment mechanism 86 for relative movement therewith along the cutting axis 82. As such, in the illustrated embodiment, the positioning assembly 26 is configured to move the cutting unit 18 along the three axes 62, 66, 82. In other embodiments, the positioning assembly 26 may be configured to move the cutting unit 18 along only some of the axes 62, 66, 82 (e.g., the first and second axes 62, 66 only). Further, in other embodiments, the CNC router 10 includes a 5-axis positioning assembly (i.e., rotation angle between x and z, and rotation angle between y and z) for moving the cutting unit 18 along 5 axes to provide non-vertical cutting (i.e., cutting that is non-parallel to the cutting axis 82).

The positioning assembly 26 includes a plurality of rollers and drive motors 90 (FIGS. 1 and 2) for allowing movement of the cutting unit 18 along the first, second, and cutting axes 62, 66, 82. The rollers are supported by the rails 70, 74, 78. The illustrated drive motors 90 are positioned above the intermediate rail 78 at the first end 34 (FIG. 1). In addition, the drive motors 90 may be positioned on the first and second sides 42, 46 of the base 14. The drive motors 90 may be electrically connected to a controller (see controller 210, FIG. 9) for controlling the x, y, and z-coordinates of the cutting unit 18. In one embodiment, the drive motors 90 include a first motor for controlling movement of the cutting unit 18 in the x-direction, a second motor for controlling movement of the cutting unit 18 in the y-direction, and a third motor for controlling movement of the cutting unit 18 in the z-direction. In particular, the workpiece 30 is positioned with respect to the first, second, and cutting axes 62, 66, 82 to control the cutting of the workpiece 30 based on a coordinate system using the x, y, and z-coordinates. Still further, in other embodiments, the positioning assembly 26 may be manually operated (e.g., such as by a toggle switch) to control the movement of the cutting unit 18.

Figure 5A:
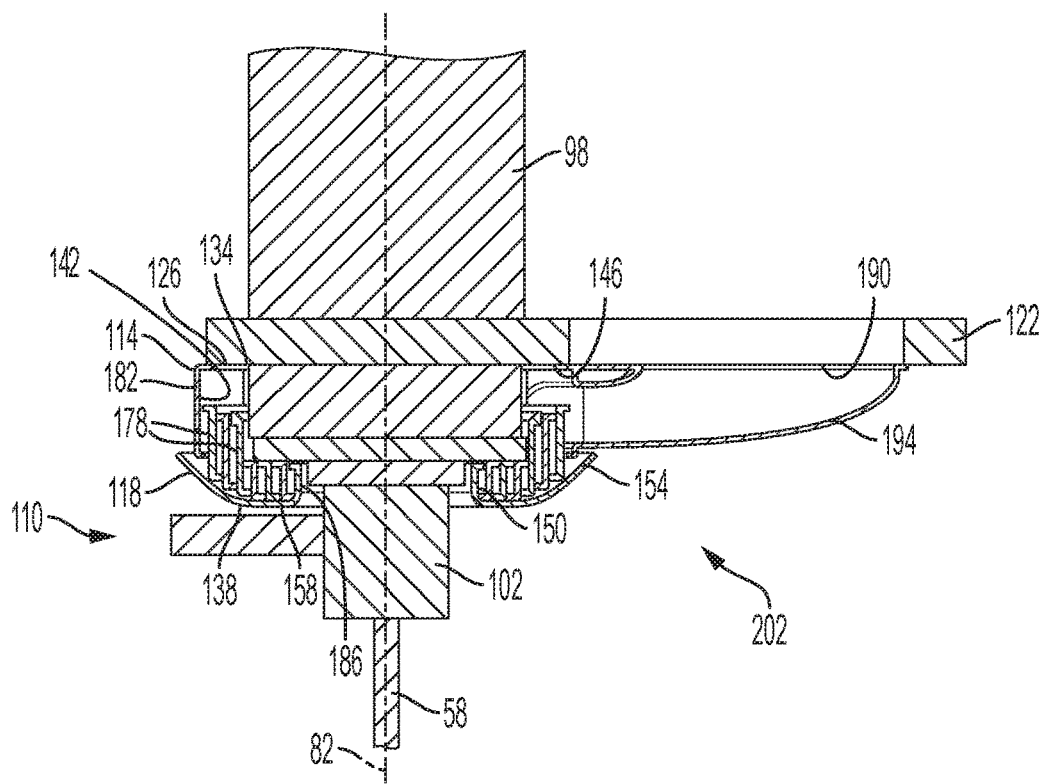
FIG. 5A is a cross-sectional view of the dust collection assembly of FIG. 4A.

With reference to FIGS. 3 and 5A, the cutting unit 18 includes an arm 94 supporting a spindle 98 (FIG. 5A). The arm 94 is movable relative to the base 14 by the positioning assembly 26. The spindle 98 is rotatably supported by the arm 94. Specifically, the arm 94 may form a rigid portion of the cutting unit 18, and the spindle 98 is rotatable relative to the arm 94. The cutting unit 18 further includes a tool holder 102 coupled for co-rotation with the spindle 98. The tool holder 102 is configured to selectively receive a plurality of different tool bits 58. The CNC router 10 is configured such that each tool bit 58 may be configured to operate on the workpiece 30 to perform one or more of cutting, reaming, grinding, milling polishing, buffing, sanding, or otherwise remove material and/or finish the workpiece 30 positioned in the cutting zone 50. Accordingly, although the CNC router 10 is described as a CNC "cutting machine," the CNC router (or cutting machine) may operate on a workpiece 30 in ways other than cutting, depending on an attached bit. The motorized cutting tool assembly 19 of the cutting unit 18 may include the spindle 98, the tool holder 102 and the tool bit 58.

Figure 4A:
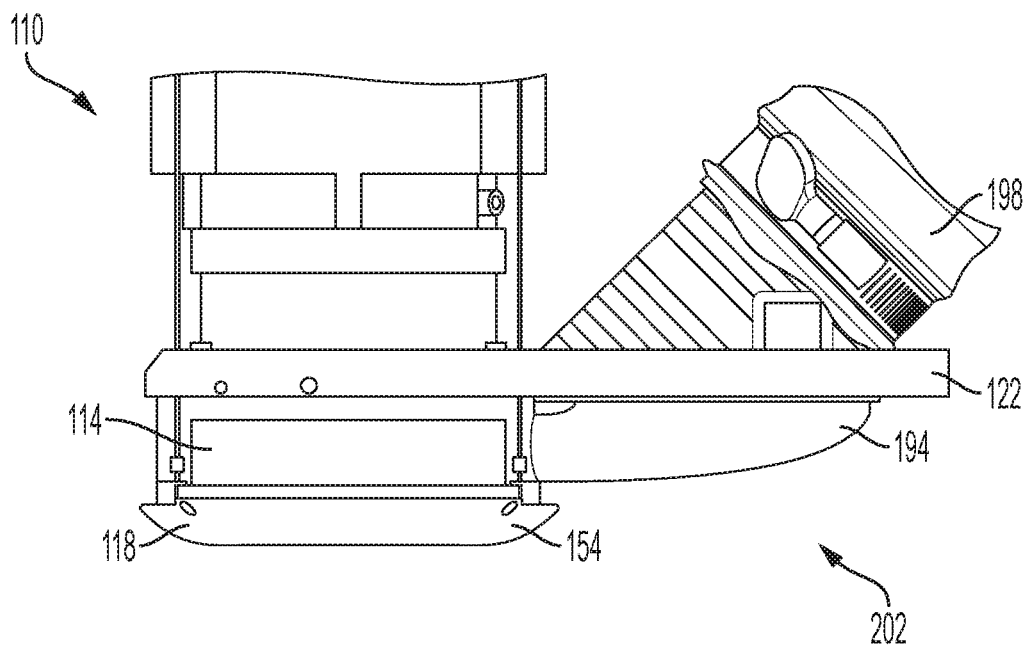
FIG. 4A is a side view of the dust collection assembly of FIG. 3 in a first, retracted position.
Figure 4B:
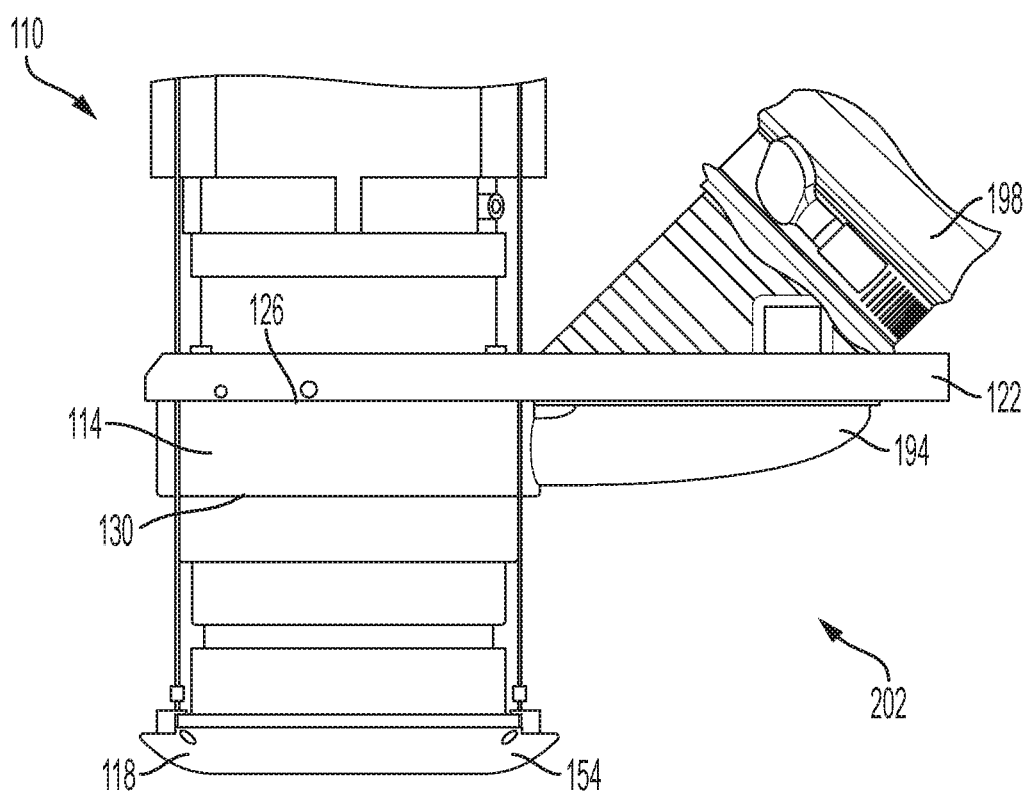
FIG. 4B is a side view of the dust collection assembly of FIG. 3 in a second, extended position.

As shown in FIGS. 3-4B, the cutting unit 18 further includes a dust collection assembly 110 supported by the arm 94 of the cutting unit 18. The dust collection assembly 110 includes an adapter 114 coupled to and supported by the arm 94, and a head 118 movably coupled to the adapter 114. The adapter 114 is coupled to and supported by the arm 94. In the illustrated embodiment, the dust collection assembly 110 includes a plate 122 (FIG. 4A) secured to the spindle 98, and the adapter 114 is secured to the plate 122. In other embodiments, the adapter 114 may be directly secured to the spindle 98, the arm 94, etc. The illustrated adapter 114 has an annular shape extending between a first edge 126 and a second edge 130 (FIG. 4B). The first edge 126 is secured to the plate 122, and the second edge 130 is opposite the first edge 126. The plate 122 includes a through-hole through which the spindle 98 extends. In some embodiments, a cross-sectional shape of the adapter 114 is generally circular when looking up from below the adapter 114 along the direction that the cutting axis 82 extends (FIG. 5A). In other embodiments, the cross-sectional shape may be different such as oval (FIGS. 7-8), square, etc.

With reference to FIG. 5A, the first edge 126 of the adapter 114 defines a first end 134 of the dust collection assembly 110. The head 118 defines a second end 138 opposite the first end 134 relative to the cutting axis 82. The adapter 114 extends from the plate 122 along the cutting axis 82 toward the second end 138. As such, the second edge 130 of the adapter 114 is positioned between the first end 134 and the second end 138. The adapter 114 and the plate 122 define a first cavity 142 (FIG. 5B) between the first and second edges 126, 130, and axially below a bottom 146 of the plate 122 (from the frame of reference of FIG. 5A) relative to the cutting axis 82.

Figure 5B:
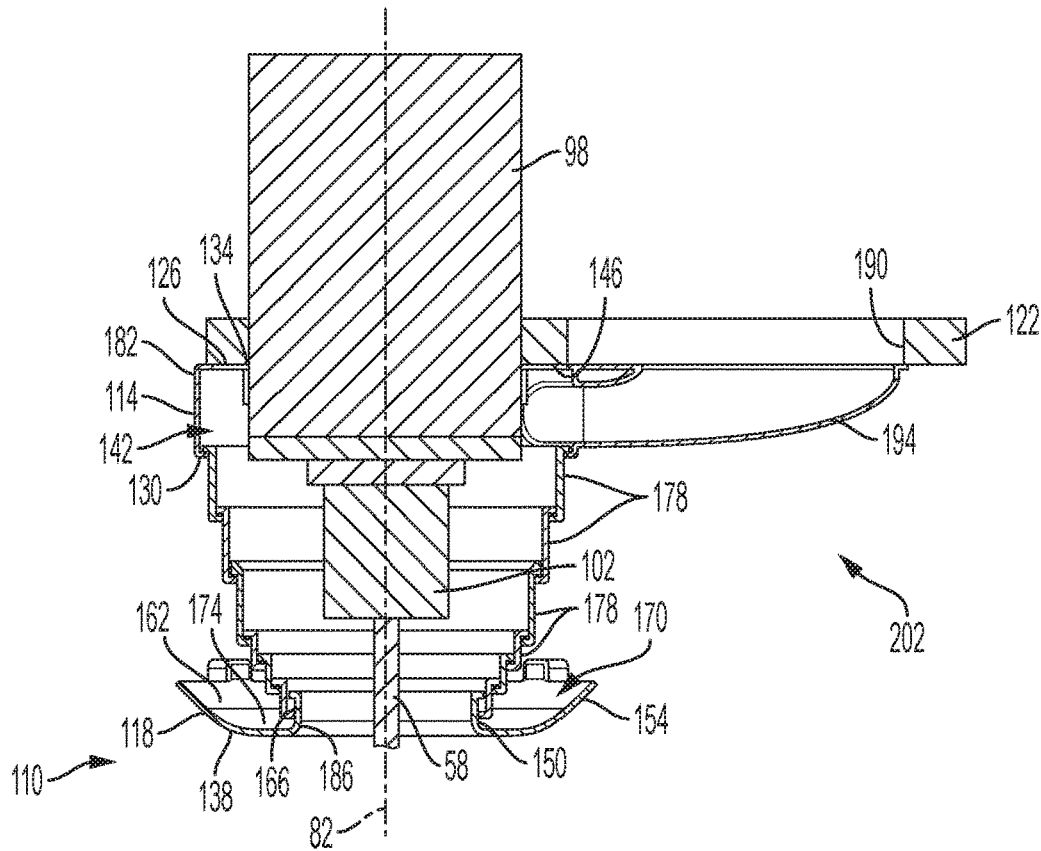
FIG. 5B is a cross-sectional view of the dust collection assembly of FIG. 4B.

With reference to FIG. 5B, the head 118 includes a first, inner portion 150 and a second, outer portion 154. The illustrated first and second portions 150, 154 each have a generally annular shape. In addition, the second portion 154 is positioned radially farther relative to the cutting axis 82 than the first portion 150 (from the frame of reference of FIG. 5B). The second portion 154 is connected to the first portion 150 by an intermediate portion 158. Specifically, the intermediate portion 158 defines the second end 138 of the dust collection assembly 110. The illustrated intermediate portion 158 is substantially flat for abutting the workpiece 30. For example, as shown in FIG. 6, the intermediate portion 158 is configured to contact the workpiece 30 (FIG. 6).

The second portion 154 surrounds the first portion 150 (FIG. 5B). More specifically, an inner surface 162 of the second portion 154 is spaced radially from an outer surface 166 of the first portion 150. In the illustrated embodiment, the inner surface 162 extends at an oblique angle from the intermediate portion 158 toward the first end 134. The outer surface 166 extends along the cutting axis 82. In other embodiments, the inner surface 162 may also extend along the cutting axis 82. The first and second portions 150, 154, and the intermediate portion 158 define a second cavity 170. In particular, the second cavity 170 is defined radially between the inner surface 162 and the outer surface 166, and axially above a top 174 of the intermediate portion 158 (from the frame of reference of FIG. 5B).

With reference to FIGS. 4A-5B, the head 118 is telescopically coupled to the adapter 114 by a plurality of nested members 178. In the illustrated embodiment, the plurality of nested members 178 includes six, individual nested members. In other embodiments, the dust collection assembly 110 may include one or more nested members 178 (e.g., one, two, etc.). The head 118 is movable along the cutting axis 82 away from the first end 134 by the nested members 178. In particular, the head 118 is movable between a first, retracted position (FIGS. 4A and 5A) and a second, extended position (FIGS. 4B and 5B). As shown in FIG. 5A, in the retracted position, the nested members 178 are received in the first cavity 142 and/or the second cavity 170, and the head 118 is axially closer to the first end 134. Furthermore, the nested members 178 and the head 118 are telescopically nested such that the nested members 178 and the head 118 surround the spindle 98 (and expose the tool holder 102). As shown in FIG. 5B, in the extended position, the nested members 178 telescope out relative to the adapter 114 such that the nested members 178 and the head 118 surround the tool holder 102 and the tool bit 58 received in the tool holder 102. In addition, in the extended position, the head 118 is axially farther from the first end 134. The adapter 114 may be termed as the "outermost annular member", and the head 118 (i.e., the first portion 150) may be termed as the "innermost annular member." In some embodiments, as illustrated, a portion of the inner surface 162 of the head 118 overlaps an outer surface 182 of the adapter 114 proximate the second edge 130 of the adapter 114 when the head 118 is in the retracted position.

At least in some embodiments, relative to other non-nesting constructions of a collapsible head that may have an extended and retracted position, the nesting capability of the head 118 with nested members 178 can reduce the overall height of the head 118 when in the retracted position, better exposing the tool holder 102 for bit changes. In addition, the telescoping nested members 178 may allow the dust collection assembly 110 to be adapted for tool bits 58 having different lengths, workpieces 30 having different heights relative to the cutting axis 82, and/or the CNC router having a variable cutting depth relative to the cutting axis 82. The dust collection assembly 110 may be further configured to have a maximum length (distance between the first end 134 and the second end 138) relative to the cutting axis 82 when the head 118 is in the extended position corresponding to the tool bit 58 having the longest length (relative to the cutting axis 82). Further, the illustrated nested members 178 are formed of plastic. In other embodiments, the nested members 178 may be formed by other materials having rigidity.

The dust collection assembly 110 includes an inlet 186 and an outlet 190. The inlet 186 and the outlet 190 are fluidly connected when the head 118 is in the extended position. The illustrated inlet 186 is defined by the head 118 (i.e., by the first portion 150) at the second end 138 of the dust collection assembly 110. The illustrated outlet 190 is defined by the plate 122. In particular, the inlet 186 and the outlet 190 are fluidly connected by the nested members 178 and the adapter 114 (i.e., the first cavity 142) when the head 118 is in the extended position. Furthermore, in the illustrated embodiment, the dust collection assembly 110 includes a conduit 194 (FIG. 5B) forming a passageway for fluidly connecting the first cavity 142 of the adapter 114 to the outlet 190. The illustrated conduit increases in diameter from the connection at the adapter 114 to the outlet 190. In other embodiments, the diameter may be the same from the connection at the adapter 114 to the outlet 190, decrease in diameter, etc. A vacuum 198 (i.e., vacuum hose) is fluidly connected to the outlet 190. As such, the head 118, the nested members 178, the adapter 114, and the conduit 194 may be cooperatively defined as a vacuum attachment 202. In other embodiments, the vacuum 198 is directly connected to the adapter 114 such that the conduit 194 is not included in the vacuum attachment 202.

With reference to FIG. 6, the vacuum 198 is configured to draw air through the inlet 186. The air is subsequently directed through the vacuum attachment 202 from the inlet 186 to the outlet 190. The head 118 is configured to contact the workpiece 30 such that a seal is at least partially created between the head 118 and the workpiece 30 when the head 118 is in the extended position. As such, the seal may facilitate the drawing of the air through the inlet 186. In particular, the air is drawn by the vacuum 198 during operation of the spindle 98 such that debris (e.g., wood chips, dust, etc.) from which the workpiece 30 is formed of is drawn through the vacuum attachment 202 by the vacuum 198 during cutting of the workpiece 30. Therefore, the dust collection assembly 110 is configured to inhibit accumulation of debris around the tool bit 58 during operation of the spindle 98. Additionally, when the head 118 is in the retracted position, the vacuum 198 may provide sufficient airflow for drawing debris, and/or otherwise be configured to prevent a burn out of the dust collection assembly 110. The term "dust collection assembly" may be used herein to refer to various forms of a powered dust collector such as a vacuum, a wet-dry vacuum, etc.

Figure 9:
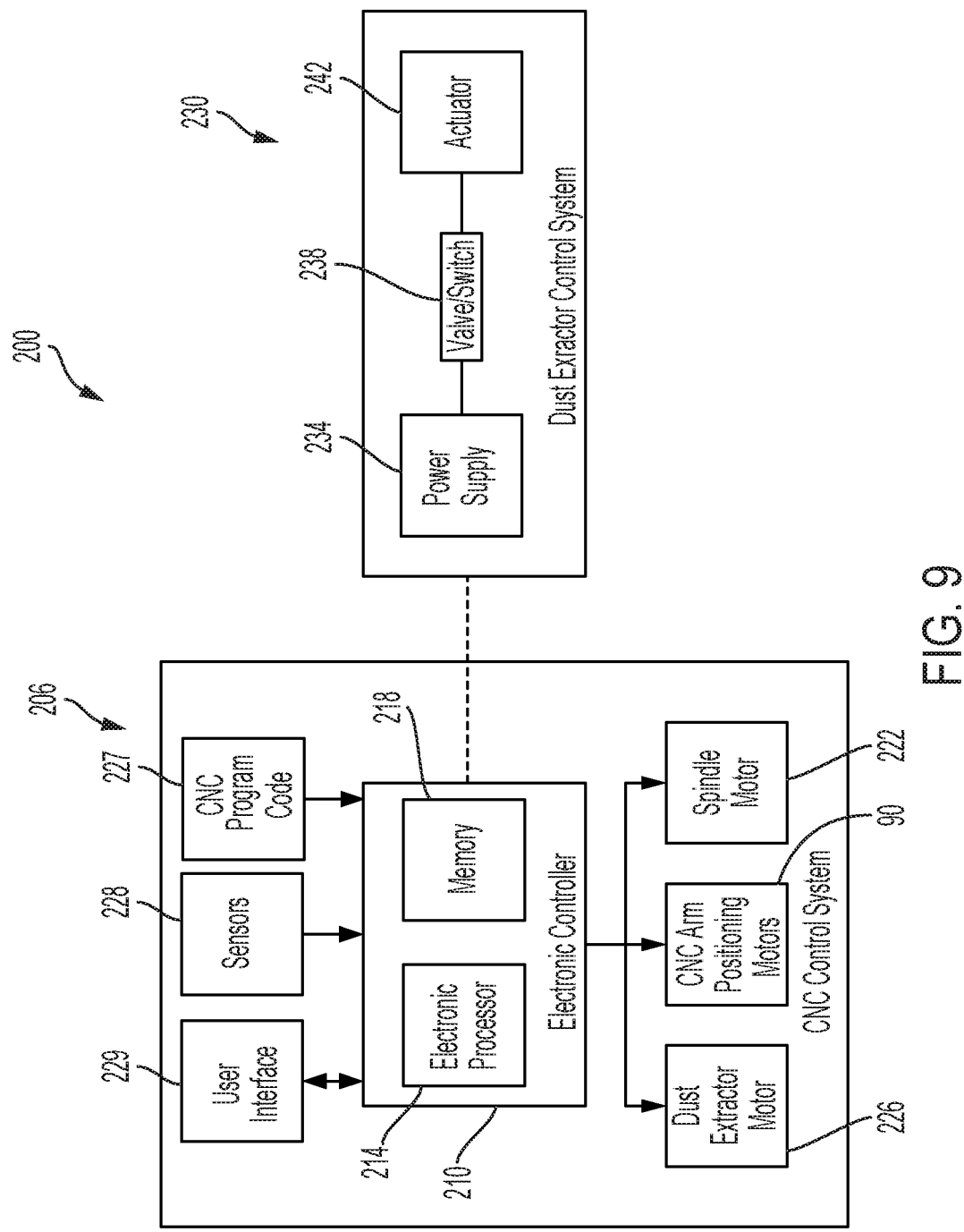
FIG. 9 is a block diagram of a control system of the cutting machine of FIG. 1 and a control system of the dust collection assembly of FIG. 3.

With reference to FIG. 9, the CNC router 10 includes a control system 200, which includes a CNC control system 206 and a dust extractor control system 230. The CNC control system 206 includes an electronic controller 210 having an electronic processor 214 and a memory 218. The controller 210 is connected to a motor 222 of the spindle 98 and the drive motors 90 of the positioning assembly 26 to control operation of the spindle 98 and the positioning of the cutting unit 18 within the coordinate system of the cutting zone 50, respectively. The illustrated controller 210 is further connected to a dust extractor motor 226 of the vacuum 198 for controlling the dust extraction through the dust collection assembly 110 (e.g., to turn on the suction, turn off the suction, and/or set the level of the suction).

The CNC router 10 may further include one or more sensors 228 connected to the controller 210. The sensors 228 are configured to indicate to the controller 210 one or more parameters (e.g., speed of spindle motor 222, position of spindle 98 in terms of the x, y, and z-coordinates, etc.). For example, the sensors 228 may include Hall sensors, tachometers, or encoders used to sense, and indicate to the controller 210, the position, speed, and/or acceleration of the positioning motors 90. Using an initial position or calibration step, and tracking movement of the positioning motors using the sensors 228, the controller 210 is configured to determine the present location and motion of the spindle 98. As such, the controller 210 may at least partially operate the cutting unit 18 based on readings of the respective sensors 228.

The CNC router 10 may further include a user interface 229 (FIG. 9) connected to the controller 210. The user interface 229 includes, for example, a touch screen, display, button(s), levers, toggles, and the like to receive user input. Furthermore, in at least one embodiment, the user interface may include a touch screen used to display a graphical user interface and receive input from the user with respect to the graphical user interface.

The CNC control system 206 may be controlled by a program code 227 (e.g., provided via a USB flash drive, a laptop with CNC program coupled to the CNC router 10, etc.). The program code, when executed by the electronic processor 214, causes the CNC machine 100 to implement an operation (e.g., cutting) to a workpiece 30 defined by the code. In particular, the program code may specify the path and speed of of travel of the spindle (e.g., via x, y, z-coordinates), a spindle rotation speed, etc.

With continued reference to FIG. 9, the dust extractor control system 230 includes a power supply 234, a switch or valve 238, and an actuator 242. As described in detail below with a particular example, switch 238 is controlled to selectively enable the power supply 234 to actuate the actuator 242 to selectively retract and extend the head 118. In the illustrated embodiment, the control system 230 of the dust collection assembly 110 is connected to the controller 210 of the CNC router 10 (e.g., to control power to the power supply 234). In the below-described embodiment of FIGS. 10A-B, the switch 238 is controlled using physical actuation caused by movement of the cutting unit 18. In other embodiments, the controller directly controls the switch 238 (e.g., via electrical signals. In other embodiments, the dust collection assembly control system 230 may work independently of the CNC router controller 210. Still further, the dust collection assembly 110 may be manually operated (e.g., a user may toggle the power supply to an enabled state and toggle the switch 238 on and off manually, for example, by depressing a button). In still other embodiments, the CNC router controller 210 may include additional switches/valves, similar to the switch 238, connected between the power supply 234 and the actuator 242, but that is positioned outside an area of the cutting zone 50, the tool changing zone 54, or the CNC router 10 altogether for manual operation by the operator (e.g., as opposed to operation by the arm 249).

Figure 10A:
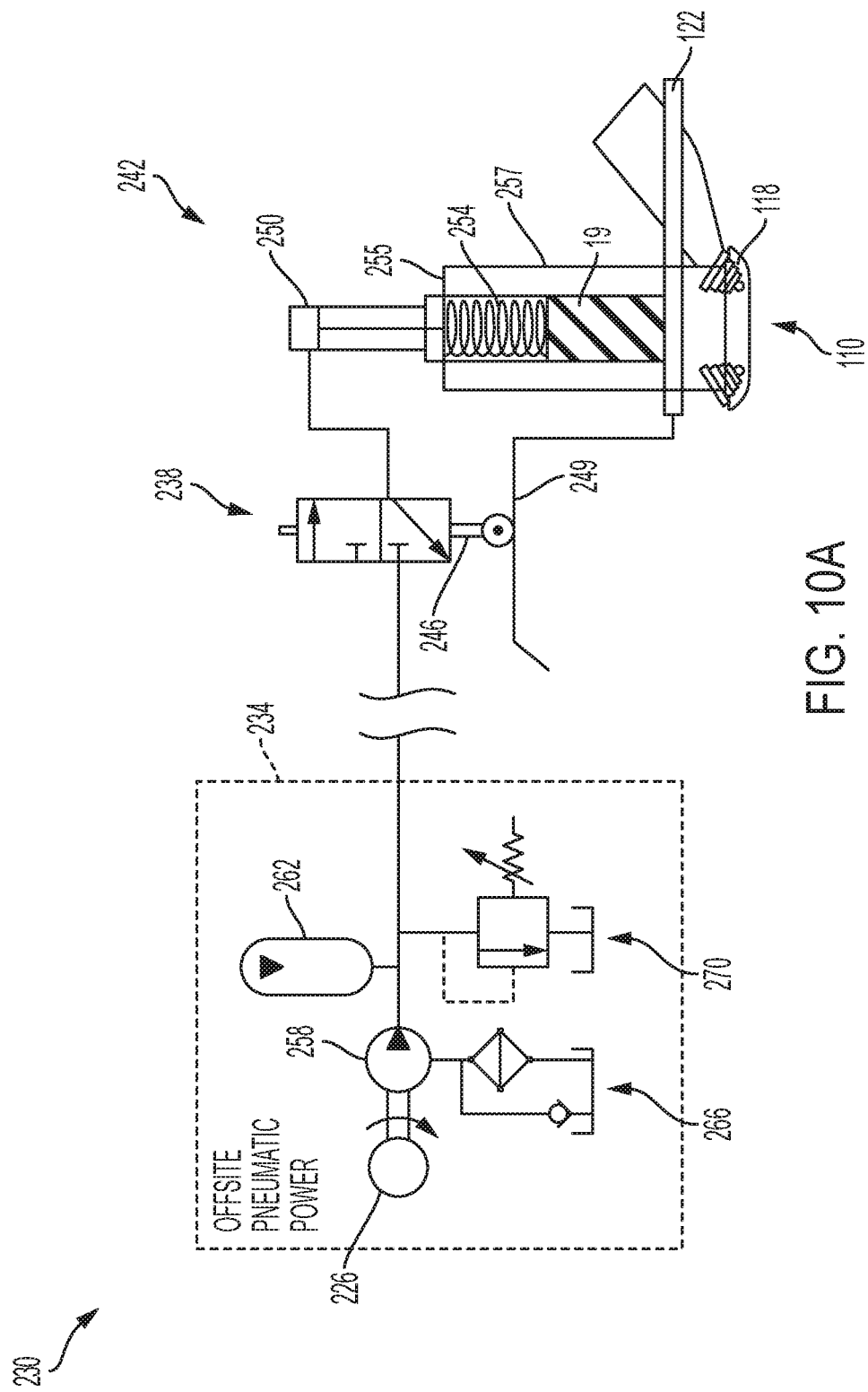
FIG. 10A is a schematic diagram of the control system of the dust collection assembly of FIG. 9 illustrating the dust collection assembly in the retracted position.
Figure 10B:
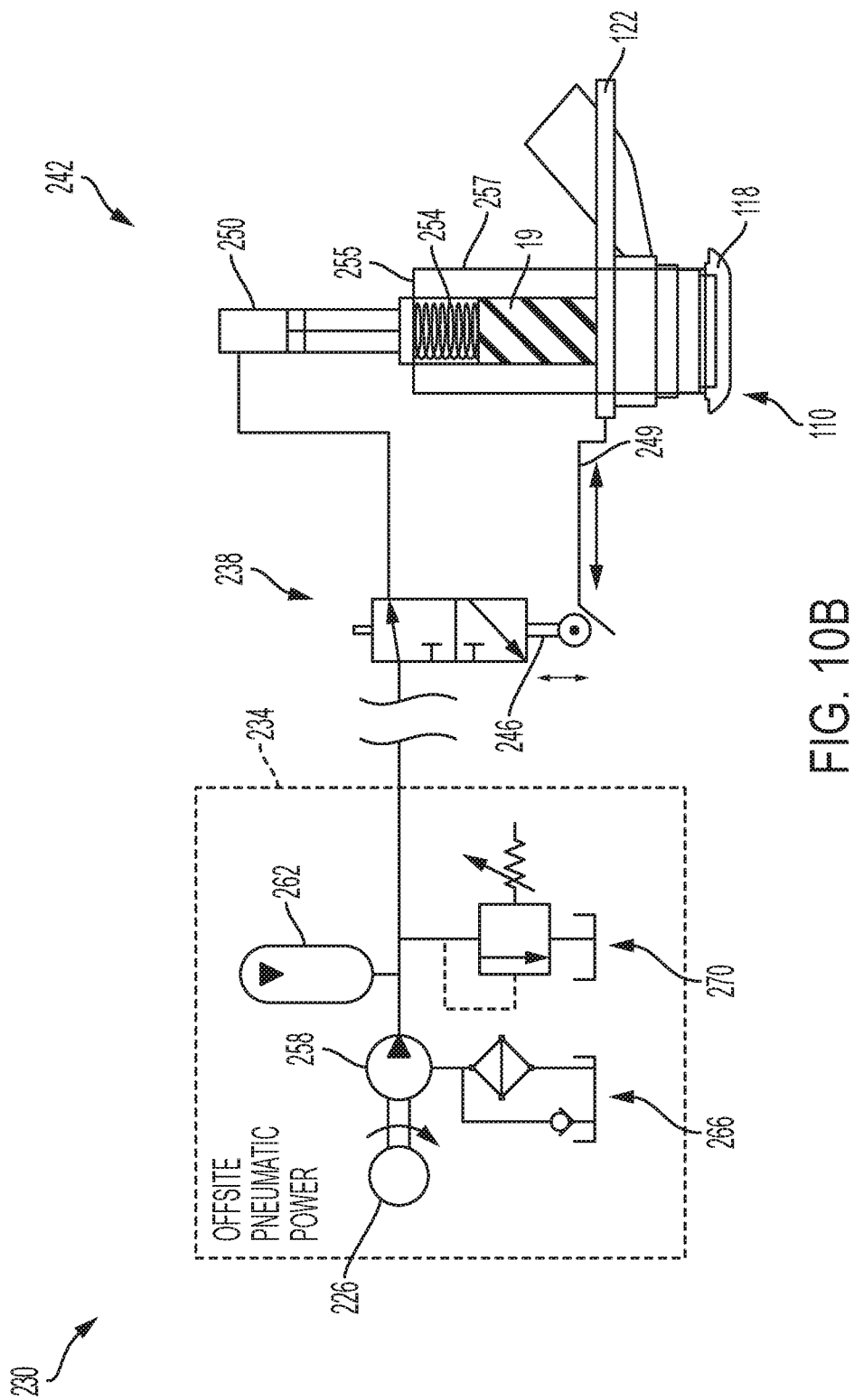
FIG. 10B is another schematic diagram of the control system of the dust collection assembly of FIG. 9 illustrating the dust collection assembly in the extended position.

FIGS. 10A-B illustrate an example of the dust extractor control system 230 with the dust collection assembly 110. The switch 238 (in this embodiment, a valve) controls operation (e.g., activation, deactivation) of the power supply 234 to selectively actuate the actuator 242 for controlling the movement of the head 118.

In the illustrated embodiment, as shown in FIGS. 10A-10B, the control system 230 of the dust collection assembly 110 is a pneumatic system in which the power supply 234 is a pneumatic power supply, the switch 238 is a pneumatic switch (e.g., two-way air valve), and the actuator 242 is a pneumatic cylinder (e.g., cylinder 250) having a compression spring 254 that biases a lifter plate 255. The actuator 242 and the lifter plate 255 are positioned on a top-side of the motorized cutting tool assembly 19, which is opposite the side of the tool assembly 19 on which the head 118 is positioned. The lifter plate 255 is coupled to the head 118 by lifter cables 257, which extend alongside the motorized cutting tool assembly 19.

The switch 238 is connected to the pneumatic power supply 234 including the motor 226, an air compressor 258, a tank or accumulator 262, a check valve 266, and a pressure relief valve 270. The power supply 234 in connection with the switch 238 is configured to direct air (i.e., high pressure air from the air compressor 258) to the cylinder 250 based on actuation of the valve control 246 by a control arm 249 of the dust collection assembly 110 that is coupled to the plate 122. For example, as shown in FIG. 10A, the head 118 is biased toward the retracted position by the compression spring 254 acting on the lifter plate 255 to raise the head 118 coupled to the lifter plate 255 by the lifter cables 257, and the switch 238 is in an open position for fluidly connecting the cylinder 250 to the outside atmosphere. In particular, a valve control 246 of the switch 238 is engaged by the control arm 249, thereby maintaining the switch 238 in the open position. As shown in FIG. 10B, when the control arm 249 is disengaged from the valve control 246, the switch 238 is moved into the closed position and the high pressure air is received in the cylinder 250 to thereby apply a downward force to the lifter plate 255 to move the head 118 into the extended position against the bias of the spring 254. When the control arm 242 again engages the valve control 246, the switch 238 is moved to the open configuration and the high pressure air is released from the cylinder 250, thereby allowing the head 118 to return to the retracted position under the bias of the spring 254. As such, the actuator 242 is configured to automatically adjust the head 118 between the extended position and the retracted position. In some embodiments, the compression spring 254 is positioned on top of the lifter plate 255, but still biases the lifter plate 255 in the upward direction, in the frame of reference of FIGS. 10A-B. In some embodiments, the compression spring 254 is configured to provide a downward biasing force and the actuator 242, when activated and filled with compressed air, moves the lifter head upward, against the bias of the spring, to move the head 118 into a retracted position. Accordingly, in some embodiments, the head 118 is biased into the retracted position, while in other embodiments, the head 118 is biased into the extended position.

Alternatively, as explained in greater detail below, in other embodiments, the control system 230 of the dust collection assembly 110 uses other actuation systems, for example, electrically motorized, hydraulic, or magnetic actuation systems, to control the movement of the head 118 between the retracted position and the extended position.

When the head 118 is moved into the retracted position (e.g., by the control system 230), the plurality of nested members 178 are collapsed relative to the adapter 114 such that the head 118 is positioned closer to the first end 134 of the dust collection assembly 110. When the head 118 is moved into the extended position, the nested members 178 telescope out relative to the adapter 114 to position the head 118 farther from the first end 134.

The head 118 is movable to the retracted position and the extended position during specific operation of the cutting unit 18. More specifically, the head 118 is moved into the retracted position prior to the movement of the spindle 98 by the positioning assembly 26. For example, when the controller 210 determines to move the spindle 98 into the cutting zone 50, the control system 230 of the dust collection assembly 110 moves the head 118 into the retracted position. In another example, when the controller 210 determines to move the spindle 98 into the tool changing zone 54 (i.e., after cutting of the workpiece 30), the control system 230 moves the head 118 from the extended position into the retracted position. Additionally, when the controller 210 determines to begin cutting of the workpiece, the control system 230 moves the head 118 into the extended position prior to operation of the spindle 98.

Figure 11:
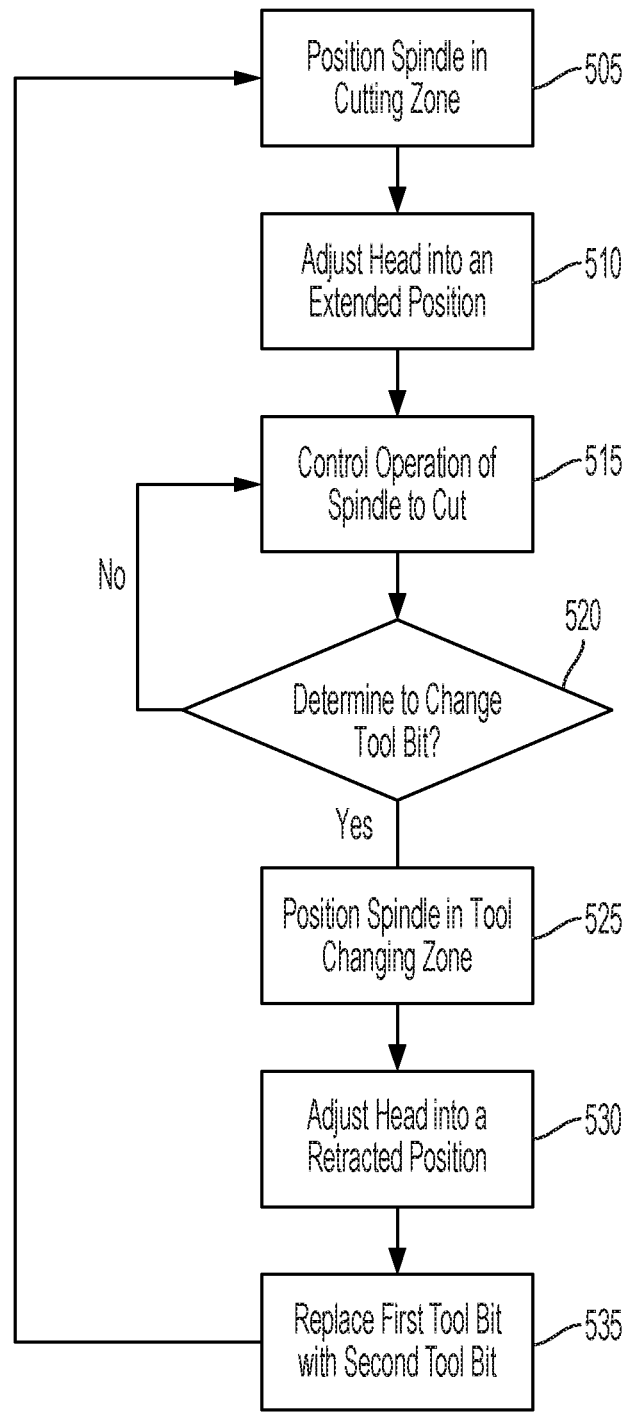
FIG. 11 is a flow diagram for replacing a tool bit of the cutting machine of FIG. 1.

FIG. 11 illustrates a flow diagram for replacing a tool bit of the CNC router 10. As shown in FIG. 11, the control system 200 is configured to selectively control the movement of the head 118 into the retracted position to facilitate replacing of the tool bit 58 with another tool bit 58. In particular, in block 505, during operation of the CNC router 10, the control system 200 positions the spindle 98 into the cutting zone 50. For example, the controller 210 drives the positioning motors 90 to move the motorized cutting tool assembly 19, including the spindle 98, into the cutting zone, using above-described techniques.

In block 510, the control system 200 adjusts the head 118 into an extended position in which the head 118 contacts the workpiece. For example, with reference to FIG. 10B, when the controller 210 moves the motorized cutting tool assembly 19 into the cutting zone, the control arm 249 disengages with the valve control 246. Upon disengagement, the switch 238 is moved into the closed position and the high pressure air is received in the cylinder 250 to thereby apply a downward force to the lifter plate 255 to move the head 118 into the extended position against the bias of the spring 254.

In decision block 520, the control system 200 determines whether to change the tool bit 58. For example, the controller 210 may determine to change the tool bit 58 upon receipt of a request to change the tool bit 58. For example, the request may be received by the controller 210 based in input received from the user via the user interface 229 (FIG. 9), or may be received by the controller 210 when the controller 210, while executing a programmed cutting operation (e.g., via the program code 227), reaches a point in the cutting program that instructs the controller 210 to switch tool bits 58. When the control system 200 determines not to change the tool bit 58, the control system 200 returns to block 515 and continues the cutting operation. When the control system 200 determines to change the tool bit 58, the controller system 200 proceeds to block 525 and positions the spindle 98 in the tool changing zone 54. For example, the controller 210 controls the positioning motors 90 to re-position the spindle 98 from the cutting zone 50 to the tool changing zone 54.

In block 530, the control system 200 adjusts the head from the extended position into the retracted position such that the head 118 is in the retracted position when the spindle 98 is in the tool changing zone 54. For example, with reference to FIG. 10A, when the controller 210 moves the motorized cutting tool assembly 19 into the tool changing zone 54, the control arm 249 engages with the valve control 246. Upon engagement, the switch 238 is moved into the open position and the high pressure air exits the cylinder 250 through the switch 238, and the compression spring 254 biases the lifter plate 255 upward to place the head 118 to the retracted position.

In block 535, with the head 118 in the retracted position and the spindle in the tool changing zone 54, the control system 200 replaces the tool bit 58 (a first tool bit) with another tool bit 58 (a second tool bit). For example, the controller 210 may be configured to position the spindle 98 above an empty tool bit holder of the tool bit holders 60 (FIG. 2), and to cause the spindle to release the tool bit 58 into the empty tool bit holder. Then, the controller 210 may be configured to re-position the spindle above another tool bit holder of the tool bit holders 60 that has a desired replacement tool bit, and to cause the spindle 98 to receive and secure the replacement tool bit. To release and secure a tool bit, the spindle 98 may include a controllable chuck or other mechanism that, for example, releases a tool bit in response to a first signal from the controller 210 and secures a tool bit in response to a second signal from the controller 210. As such, the tool bit 58 may be automatically changed by the control system 200 without manual intervention. After the (second) tool bit 58 is secured to the spindle 98, the control system 200 returns to block 505 to position the spindle to the cutting zone 50, extend the head 118, and operate on a workpiece 30.

Accordingly, at least in some embodiments, the switch 238 and the control arm 249 are positioned on the CNC router 10 such that they engage one another while the motorized cutting tool assembly 19 is in the tool changing zone 54 (retracting the head 118 to allow a tool bit change), and disengage one another while the motorized cutting tool assembly 19 is in the cutting zone 50 (extending the head 118 to enable dust extraction while cutting).

Additionally, although the blocks 505-535 are described as being performed serially and in a particular order, one or more of the blocks may be executed in parallel, or partially in parallel, and in a different order. For example, the execution of blocks 505, 510, and 515 may overlap one another, or be performed in a different order, such that the spindle 98 begins driving before the head 118 is completely extended, before the spindle 98 is in the cutting zone 50, or both. Similarly, the execution of the blocks 525, 530, and 535 may overlap or be performed in a different order.

While the flow diagram of FIG. 11 is described with respect to the embodiments of FIGS. 10A-B, in some embodiments of the flow diagram, difference embodiments of the dust extractor control system 230 and dust collection assembly 110 are used. For example, as noted above, in some embodiments, the control system 230 of the dust collection assembly 110 uses other actuation systems, for example, a motorized, hydraulic, or magnetic actuation systems, to control the movement of the head 118 between the retracted position and the extended position. For example, in some embodiments, rather than a pneumatic system as described in FIGS. 10A-B, a hydraulic system is used that is similar but for the use of hydraulic fluid in place of pneumatic fluid. For example, in place of the pneumatic power supply 234, (valve) switch 238, and pneumatic cylinder 250 with compression spring 254 shown in FIGS. 10A-B, a hydraulic power supply is provided as the power supply 234, the (valve) switch 238 remains (e.g., as two-way valve), and a hydraulic cylinder 250 with compression spring 254 is provided as the (hydraulic) actuator 242. Further, in another example, the switch 238 includes a two-way cylinder and alternative valve control, and does not include the compression spring.

In some embodiments of the pneumatic or hydraulic system, rather than a switch 238 (e.g., two-way valve) that is actuated by physical manipulation of the valve control 246 by a control arm 249 or other element coupled to move with the motorized cutting tool assembly 19, the switch 238 is electronically controlled by the controller 210. For example, the controller 210 is electronically coupled to the switch 238 and is configured to selectively send an open signal and a close signal to the switch 238 to control the switch to open and close, respectively. For example, with reference to FIG. 11, in block 510, the controller 210 determines when the position of the spindle 98 is in or on route to the cutting zone 50 (e.g., using the sensors 228 monitoring the position of the positioning motors 90), and sends a close signal to the switch 238 to place the head 118 in the extended position. Similarly, in block 530, the controller 210 determines when the position of the spindle 98 is in or on route to the tool changing zone 54 (e.g., using the sensors 228 monitoring the position of the positioning motors 90), and sends an open signal to the switch 238 to place the head 118 in the retracted position.

In some embodiments, rather than pneumatic or hydraulic system, the dust extractor control system 230 includes a motorized system. For example, in place of the pneumatic power supply 234, (valve) switch 238, and pneumatic cylinder 250 with compression spring 254 shown in FIGS. 10A-B, an electric power supply (e.g., DC or AC power source) is provided as the power supply 234, an electric switch (e.g., a field effect transistor, inverter bridge, or relay) is provided as the switch 238, and a motor (e.g., a stepper motor, universal motor, brushless motor) is provided as the (motorized) actuator 242. In such embodiments, the switch 238 is controlled by the controller 210 to selectively supply power from the electric power supply (power supply 234) to the motor (actuator 242) to cause the motor to selectively drive the lifter plate 255 up and down. For example, with reference to FIG. 11, in block 510, the controller 210 determines when the position of the spindle 98 is in or on route to the cutting zone 50 (e.g., using the sensors 228 monitoring the position of the positioning motors 90), and sends a control signal to the switch 238 to drive the motor to drop the lifter plate 255 and place the head 118 in the extended position. Similarly, in block 530, the controller 210 determines when the position of the spindle 98 is in or on route to the tool changing zone 54 (e.g., using the sensors 228 monitoring the position of the positioning motors 90), and sends a control signal to the switch 238 to drive the motor to lift the lifter plate 255 and place the head 118 in the retracted position.

In some embodiments, the dust extractor control system 230 includes a magnetic actuation system. For example, in place of the pneumatic power supply 234, (valve) switch 238, and pneumatic cylinder 250 with compression spring 254 shown in FIGS. 10A-B, an electric power supply (e.g., DC or AC power source) is provided as the power supply 234, an electric switch (e.g., a field effect transistor or relay) is provided as the switch 238, and a solenoid is provided as the (magnetic) actuator 242, with the lifter plate 255 including a ferromagnetic material. In such embodiments, the switch 238 is controlled by the controller 210 to selectively supply power from the electric power supply (power supply 234) to the solenoid (actuator 242) to cause the solenoid to selectively lift the lifter plate 255 up and drop the lifter plate 255 down. Similar to the pneumatic system of FIGS. 10A-B, a compression spring 254 may be included to bias the lifter plate 255 when the solenoid is not enabled. For example, with reference to FIG. 11, in block 510, the controller 210 determines when the position of the spindle 98 is in or on route to the cutting zone 50 (e.g., using the sensors 228 monitoring the position of the positioning motors 90), and sends a control signal to the switch 238 to disable the solenoid to drop the lifter plate 255 and place the head 118 in the extended position. Similarly, in block 530, the controller 210 determines when the position of the spindle 98 is in or on route to the tool changing zone 54 (e.g., using the sensors 228 monitoring the position of the positioning motors 90), and sends a control signal to the switch 238 to enable the solenoid, magnetically attracting the lifter plate 255 towards the solenoid, to lift the lifter plate 255 and place the head 118 in the retracted position.

In some embodiments, the dust collection assembly 110 is an after-market device for the CNC router 10 and, accordingly, is configured to be implemented into a previously existing CNC router 10. In other embodiments, the dust collection assembly 110 is integrated into a CNC router 10 at the time of manufacture and provided as an integrated unit.

Figure 7:
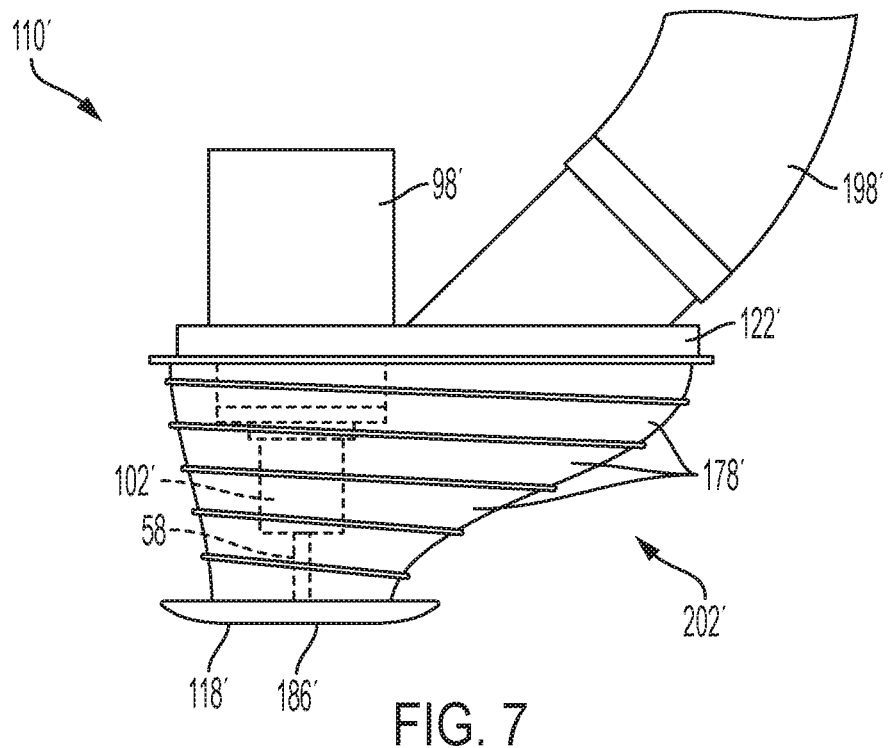
FIG. 7 is an alternative embodiment of the dust collection assembly of FIG. 3.
Figure 8:
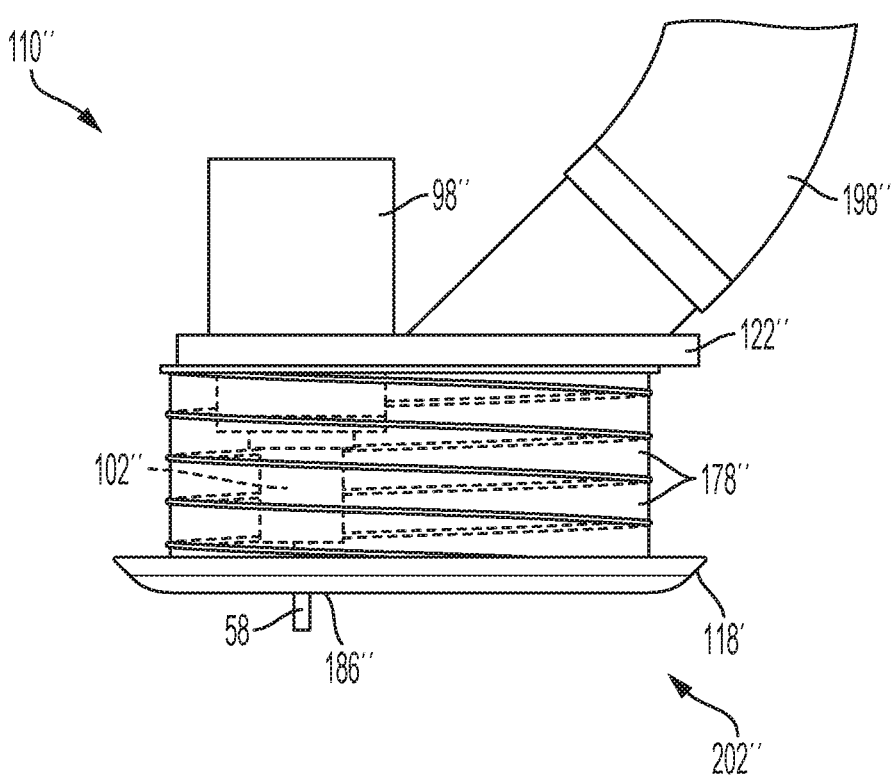
FIG. 8 is another alternative embodiment of the dust collection assembly of FIG. 3.

FIGS. 7 and 8 illustrate other embodiments of the dust collection assembly 110', 110". For example, the dust collection assembly 110', 110" includes a vacuum attachment 202', 202" directly coupled between the inlet 186', 186" and the outlet 190', 190" (e.g., no intermediate conduit 194). The dust collection assembly 110' of FIG. 7 includes a single member 178' having a plurality of nested sections collapsible relative to each other. The single member 178' decreases in size from the top to the bottom, in the frame of reference of FIG. 7. Similarly, the dust collection assembly 110" of FIG. 8 includes a single member 178" having the plurality of nested sections of about the same size forming the dust collection assembly 110". The illustrated member 178', 178" may be formed by a metal helical coil spring embedded within a flexible material such as nylon, plastic, etc. As such, the helical coil tubing may be spring-biased to an extended position, but collapsible into a retracted position. In other embodiments, the single member 178', 178" may be formed by a film or otherwise airtight material configured to withstand a load of the vacuum 198 (i.e., the single member 178', 178" does not collapse in on itself by the load of the vacuum 198) and extend/retract into the extended and retracted positions.

The dust collection assemblies 110' and 110", in some embodiments, are used in conjunction with the flow diagram 500 of FIG. 11. For example, the heads 118', 118" are secured to the lifter plate 255 via the lifter cables 257 similar to the head 118 and then selectively, automatically controlled to extend and retract. In some embodiments, the dust collection assemblies 110, 110', and 110" (e.g., the heads 118, 118', 118") are manually manipulated by an operator to move between an extended and retracted position, rather than automatically controlled by a control system, such as by the control system 200.

In some embodiments of the dust collection assembly 110, the vacuum attachment 202 or portions thereof may be formed by a transparent material. This may allow an operator to view the tool holder 102 and/or the tool bit 58 received by the tool holder 102.

The dust collection assembly 110 described herein prevents or limits fingers of the operator and other foreign objects (e.g., pressurized air wand for blowing debris away from the tool bit) from approaching the tool bit 58 during operation of the spindle 98 (i.e., when the dust collection assembly 110 is in the extended position). In addition, the dust collection assembly 110 prevents a hose of the vacuum 198 from approaching the tool bit 58 during operation of the spindle 98.

With reference to FIG. 12, in another configuration of the dust collection assembly 110, the head 118 may include a plurality of protrusions 278 on the intermediate portion 158, proximate to and around the inlet 186, and protruding downward toward the table 22 and the workpiece 30. The illustrated protrusions 278 (shown schematically in FIG. 12) facilitate sliding of the head 118 over the workpiece 30, and inhibit wear to the head 118 (i.e., to the intermediate portion 158). In addition, the protrusions 278 may be configured to optimize airflow through the inlet 186 by preventing choking of the inlet 186 when the cutting unit 18 idles in one location (such as during drilling operations, slow-moving engraving of the workpiece 30, cutting of smaller features into a workpiece, smaller sized workpieces, etc.), or otherwise is positioned such that the inlet 186 may be blocked. More specifically, the protrusions 278 may prevent stagnant airflow when the cutting unit 18 is positioned such that the inlet 186 is blocked. In one example, the spindle 98 may be positioned in a deep recess of the workpiece 30 relative to the cutting axis 82 such that the inlet 186 may become blocked.

With continued reference to FIG. 12, the dust collection assembly 110 may further be configured to prevent a crash of the dust collection assembly 110 (i.e., into a portion of the workpiece 30, a portion of the CNC router 10, etc.) during cutting. In one embodiment, the dust collection assembly 110 includes a plurality of sensors 282 (shown schematically by the boxes in FIG. 12). The sensors 282 may be positioned proximate the head 118. The illustrated sensors 282 are positioned on either side of the head 118. The sensors 282 are connected to the control system 230 of the dust collection assembly 110. In FIG. 12, each sensor 282 illustrated is a proximity sensor. The control system 200 of the dust collection assembly 110 may be configured to retract the head 118 to the retracted position based on the readings of the proximity sensor 282. For example, the controller 210 may receive a signal from one of the proximity sensors 282 indicative of an approaching obstacle and, in response, the controller 210 controls the switch 238 to retract the head 118. In addition, when the controller 210 receives an indication from the proximity sensors that an obstacle is no longer proximate, the control system 200 may control the head 118 to return to the extended position, or may include a timer to delay the return of the head 118 to the extended position.

In some embodiments, the proximity sensors 282 are non-contact sensors (e.g., optical sensors or laser distance sensors). In other embodiments, the proximity sensors 282 are contact-based sensors (e.g., capacitive or mechanically-actuated). For example, in some embodiments, the sensors 282 include first and second rings circumventing the head 118, with the first ring positioned radially outward of the second ring. When the dust collection assembly 110 is about to contact or collide with an object (e.g., a portion of the workpiece 30) the first, outer ring will be moved by the object 30 radially inward into the second, inner ring. The first and second rings may be conductive and, when in contact with one another, close a circuit loop, which causes an output by the rings (i.e., the proximity sensor 282) to the controller 210 indicating the impending collision. In response, the control system 200 may then be configured to generate a response to alert the operator of an impending crash, cause the movement of the dust collection assembly 110 to momentarily pause, and/or move the head 118 into the retracted position, lift the motorized cutting tool 98 in the z-direction, or both. In another example, the sensors 282 are non-contact sensors that are oriented downward toward the workpiece 30 and are configured to detect a distance from the head 118 to the workpiece 30. The sensors 282 provide feedback to the control system 200 for controlling a position (i.e., height) of the dust collection assembly 110 based on the distance relative to the workpiece 30 using the motors 90 of the positioning assembly 26. In this example, the electronic controller 210 may be configured to monitor the detected distance and control the positioning motors 90 or actuator 242 (via switch 238) to maintain the head 118 at a particular distance (e.g., ¼ inch, ½ inch, or another value between ¹⁄₁₆ of an inch to 1 inch) from the workpiece 30 to enable improved suction and airflow through the head 118 and to prevent the head 118 from scratching or damaging the workpiece 30.

In some embodiments, a predetermined maximum height of the dust collection assembly 110 when the head 118 is in the extended position may be set to prevent crashing of the dust collection assembly 110. In one embodiment, the predetermined maximum height may be set using a height adjustment mechanism having an arm cooperating with the head 118. The height adjustment mechanism includes a clamp to set the arm at a predetermined height. The arm may allow the head 118 to extend only partially along the axial length allowed by the nested members 178. In other embodiments, an operator may set the arm to a predetermined height for setting a predetermined extension displacement of the head 118.

In still other embodiments, the predetermined maximum height of the head 118 may be controlled with software. Specifically, the coordinate system of the CNC router 10 (e.g., Z-coordinate direction) may be used to program the predetermined maximum height. As such, a predetermined path of the spindle 98 during cutting may be optimized.

In some embodiments, the dust collection assembly 110 may be held down into the extended position by a plurality of weights 286 or an energized actuator under a predetermined load (e.g., mechanical spring), a positionally controlled actuator, etc. In the embodiment of the CNC router configured for non-vertical operation (e.g., 5-axes positioning assembly), the mechanical spring, which is not dependent on gravitational forces for its biasing effect, may be used to facilitate or ensure the contacting between the head 118 and the workpiece 30. The dust collection assembly 110 may also include damping members for damping of the movement of the vacuum attachment 202 of the dust collection assembly 110 when the head 118 is in the extended position.

In other embodiments, the operator may manually interfere or intervene with the position of the dust collection assembly 110 for accessing the tool holder 60 prior to, during, while paused, and/or after routing of the CNC router 10. In one example, the manual operation is conducted by the toggling of the power supply to an enabled state and toggling of the switch 238 on and off manually, for example, by depressing a button. In another example, the program code 227 may be programed, separate from the program code to control the changing of the tool bit 58, to adjust the head 118 between the extended position and the retracted position. In still another example, the switch 238 may be overridden and the operator may physically engage the dust collection assembly 110 (i.e., the head 118, the telescoping nested members 178) and move the head 118 from the extended position to the retracted position. Still further, the head 118 may be maintained or otherwise held in the retracted position by a mechanical system such as by a fastener (e.g., clip) or magnet positioned on the arm 94 that is separate from the automatic actuation of the head 118 to the retracted position. The manual interference may allow the operator to monitor or inspect the tool bit 58 when the cutting unit 18 is routing or not routing (i.e., such as during set up prior to the cutting of the workpiece 30, during cutting (i.e., when the spindle 98 is paused), and/or after cutting), and/or during maintenance of the CNC router 10. In other words, the dust collection assembly 110 may be manually retained in the retracted position and/or in the extended position regardless of operation of the spindle 98. In one example, the operator may desire monitoring the cutting using the tool bit 58 during initial cutting conditions. This may facilitate evacuation of the debris (e.g., chips), and inhibit clogging. Therefore, the head 118 may be adjusted to the retracted position separate from whether or not a tool bit change is indicated to the controller.

In still other embodiments, the CNC router 10 may not include automatic retraction and extension of the dust collection assembly 110. The manual interference, as described above, is provided to adjust the head between the extended position and the retracted position for performing a manual tool bit change.

Accordingly, various embodiments of a dust collection assembly for a cutting machine are described herein that enable the automatic retraction and extension of the dust collection assembly relative to a tool bit of the cutting machine. Although the disclosure has been described in detail with reference to certain embodiments, variations and modifications exist within the scope and spirit of one or more independent aspects of the disclosure as described. Various features and advantages of the disclosure are set forth in the following claims.

What is claimed is:

1. A dust collection assembly for a computer numerical control (CNC) cutting machine, the CNC cutting machine including an arm supporting a spindle and the arm supporting a tool holder coupled to the spindle for co-rotation with the spindle, the tool holder configured to selectively receive a tool bit, the dust collection assembly comprising:

an adapter configured to couple to the arm;

a head telescopically coupled to the adapter via a plurality of nested members, each of the plurality of nested members collapsible relative to each other, the head including a first portion, a second portion spaced radially outward from the first portion, and an intermediate portion connecting the first and second portions, the intermediate portion being substantially flat, wherein the head is movable between an extended position in which the nested members are configured to surround the tool holder and the tool bit, and a retracted position in which at least some of the nested members are telescopically retracted towards the adapter, wherein the head defines an inlet fluidly connected to the plurality of nested members, and when the head is at least in the extended position the inlet is configured to fluidly connect to a vacuum, and wherein the intermediate portion of the head is configured to contact a workpiece when the head is in the extended position; and a control system including an actuator coupled to the head, the actuator configured to be controlled to adjust the head between the extended position and the retracted position, wherein the control system includes a plate movably coupled to the actuator and includes cables that couple the plate to the head such that the actuator adjusts the head between the extended position and the retracted position by acting on the plate to move the head.

2. The dust collection assembly of claim 1, wherein the actuator is a pneumatic actuator or a hydraulic actuator.

3. The dust collection assembly of claim 1, wherein the control system is configured to adjust the head into the retracted position at least when the spindle is in a tool changing zone of the CNC cutting machine and to adjust the head into the extended position when the spindle is in a cutting zone of the CNC cutting machine, and further wherein adjustment of the head occurs before operation of the spindle.

4. The dust collection assembly of claim 1, wherein the spindle and tool holder are part of a motorized cutting tool supported by the arm, and wherein the actuator is positioned on a side of the motorized cutting tool opposite the head.

5. The dust collection assembly of claim 1, wherein the vacuum is configured to direct air from the inlet through the plurality of nested members to an outlet of the dust collection assembly.

6. The dust collection assembly of claim 1, further comprising a plate configured to couple to the arm, the plate defining an outlet, and wherein a conduit fluidly connects the head and the plurality of nested members to the outlet.

7. A computer numerical control (CNC) cutting machine comprising:
- a base configured to support a workpiece;
- an arm movably supported by the base;
- a spindle rotatably supported by the arm;
- a tool holder coupled for co-rotation with the spindle, the tool holder configured to selectively receive a tool bit; and
- a dust collection assembly supported by the arm, the dust collection assembly including:
  - an adapter coupled to the arm,
  - a head telescopically coupled to the adapter via a plurality of nested members, each of the plurality of nested members collapsible relative to each other, the head movable between an extended position in which the nested members are configured to surround the tool holder and a tool bit, and a retracted position in which at least some of the nested members are telescopically retracted towards the adapter,
  - wherein the head includes a first portion, a second portion spaced radially outward from the first portion, and an intermediate portion connecting the first and second portions, the intermediate portion being substantially flat,
  - wherein the head defines an inlet fluidly connected to the plurality of nested members, and when the head is at least in the extended position the inlet is configured to fluidly connect to a vacuum, and
  - wherein the head is configured such that the intermediate portion contacts the workpiece when the head is in the extended position;
- a control system including an actuator coupled to the head, the actuator configured to be controlled to adjust the head between the extended position and the retracted position, wherein the control system includes a plate movably coupled to the actuator and includes cables that couple the plate to the head such that the actuator adjusts the head between the extended position and the retracted position by acting on the plate to move the head.

8. The CNC cutting machine of claim 7, wherein the actuator is a pneumatic actuator or a hydraulic actuator.

9. The CNC cutting machine of claim 7, wherein the CNC cutting machine includes a cutting zone and a tool changing zone, and wherein the control system is configured to adjust the head into the retracted position at least when the spindle is in the tool changing zone of the CNC cutting machine and to adjust the head into the extended position when the spindle is in the cutting zone of the CNC cutting machine, and further wherein adjustment of the head occurs before operation of the spindle.

10. The CNC cutting machine of claim 9, wherein the head further includes a plurality of protrusions located around the inlet and protruding downward toward the workpiece.

11. The CNC cutting machine of claim 7, wherein the vacuum is configured to direct air from the inlet through the plurality of nested members to an outlet of the dust collection assembly.

12. The CNC cutting machine of claim 7, wherein the base is configured to support a workpiece to be cut, wherein a seal is at least partially created between the head and the workpiece when the head is in the extended position, the seal proximate to the inlet.

13. The CNC cutting machine of claim 7 wherein the actuator includes a compression spring acting on the plate to bias the head toward the retracted position, and when the head is in the retracted position the actuator applies force to the plate to move the head to the extended position.

\* \* \* \* \*